Feb. 22, 1955

M. COHEN

PROCESS FOR REMOVING SYNTHETIC CLEANING FLUID FROM FILTER MUCK 2,702,433

Filed June 14, 1954

INVENTOR
MEYER COHEN
BY Bair, Freeman & Molinare
ATTORNEYS

Feb. 22, 1955 M. COHEN 2,702,433

PROCESS FOR REMOVING SYNTHETIC CLEANING FLUID FROM FILTER MUCK

Filed June 14, 1954 2 Sheets-Sheet 2

INVENTOR
MEYER COHEN
BY Bair, Freeman & Molinare ATTORNEYS

United States Patent Office 2,702,433

Patented Feb. 22, 1955

2,702,433

PROCESS FOR REMOVING SYNTHETIC CLEANING FLUID FROM FILTER MUCK

Meyer Cohen, Sioux City, Iowa, assignor of thirty-six per cent to Marvin D. Cohen, Sioux City, Iowa Application June 14, 1954, Serial No. 436,493

6 Claims. (Cl. 34—37)

This invention relates to a process for recovering high gravity synthetic cleaning fluids, such as chlorinated hydrocarbons, from filter muck, and is a continuation-in-part of my copending application Serial No. 335,558, filed February 6, 1953.

In dry-cleaning clothes the solvent employed in the removal of dirt, oils, grease and soil from the clothes is filtered continuously with a filter powder, such as diatomaceous earth, to purify the solvent before again contacting it with clothes. After a period of use the filter powder becomes contaminated with the foreign materials removed from the dirty clothes and must be replaced with fresh powder. At the present time it is customary to discard the contaminated powder in the form of a black, slimy sludge referred to as filter muck. The muck contains a large proportion of solvent which has been absorbed during filtering, and this solvent is lost when the muck is discarded. Chlorinated hydrocarbons, such as trichlorethylene and perchlorethylene, employed in modern dry-cleaning plants are very expensive. Even in plants of small capacity the filter muck must be discharged weekly, and consequently, the total amount of the expensive solvent wasted is appreciable. Fifty pounds of dry filter powder will retain as much as 15 to 20 gallons of perchlorethylene.

Attempts have been made heretofore to remove the solvent from the muck, for example, by squeezing the muck to press out the solvent, or by subjecting the muck to hot air to evaporate the solvent. So far as I am aware the results of these processes have been rather discouraging because only a very small proportion of the total amount of solvent present in the muck is recovered. Furthermore, such processes are lengthy and usually the solvent recovered contains some of the original contaminants and must be redistilled to purify it.

The present invention is directed to a simple, efficient method for recovering from the filter muck substantially all of the chlorinated hydrocarbon solvent in pure form. The method comprises supplying steam under pressure at a temperature above the boiling point of the solvent, removing the moisture from the steam and permitting the moisture-free steam to permeate the muck. As the hot moisture-free steam permeates the muck, the solvent volatilizes and becomes entrained in a stream of flowing steam rising from the muck. The mixture of steam and solvent in vapor form is then condensed and the purified solvent is separated by gravity from the condensed steam, ready for re-use in the cleaning plant. No further treatment is necessary.

It is essential that the steam employed in my process be treated to remove substantially all moisture before it is introduced into the muck. If moisture is not removed, the muck will foam and froth to such an extent that it will rise out of the extraction vessel and flow over into the condenser connected thereto. Furthermore, the fluid recovered with moisture-laden steam is highly acidic, contains a high proportion of impurities and must be distilled before re-using. The residue remaining is wet and gummy. These difficulties are avoided by using saturated steam from which all of the water has been removed, or superheated steam. Some condensation will take place at the beginning of a run, but operating temperature is attained within a few minutes and the amount of moisture condensed in this time can be tolerated. The pressure and volume of the steam should be great enough to cause continual flow of the steam through the muck and to entrain and carry the solvent vapors out of the extraction vessel, but not so great as to carry over the muck solids. Suitable pressure will range from 16 to 60 pounds per square inch gauge at the point of introduction into the extraction vessel described hereinafter. Saturated steam at these pressures will have a corresponding temperature range of from 252° F. to 293° F. Perchlorethylene, the solvent most frequently used in dry-cleaning plants, has a boiling point of 250° F. and will, therefore, volatilize readily in this range. Care should be taken, however, to prevent the temperature from approaching the boiling point of oils, fats and soaps which are extracted from clothes and are always present in the filter muck. These materials must not be volatilized and carried over into the condenser with the vaporized solvent. The solvent recovered in accordance with the process of this invention is of high quality, being substantially equal in purity to the solvent prior to use. All of the contaminants remain in the muck which is removed from the extraction vessel as a dry powder after the process has been completed.

An apparatus suitable for practicing the process of my invention is illustrated in the accompanying drawings, in which.

Figure 1:
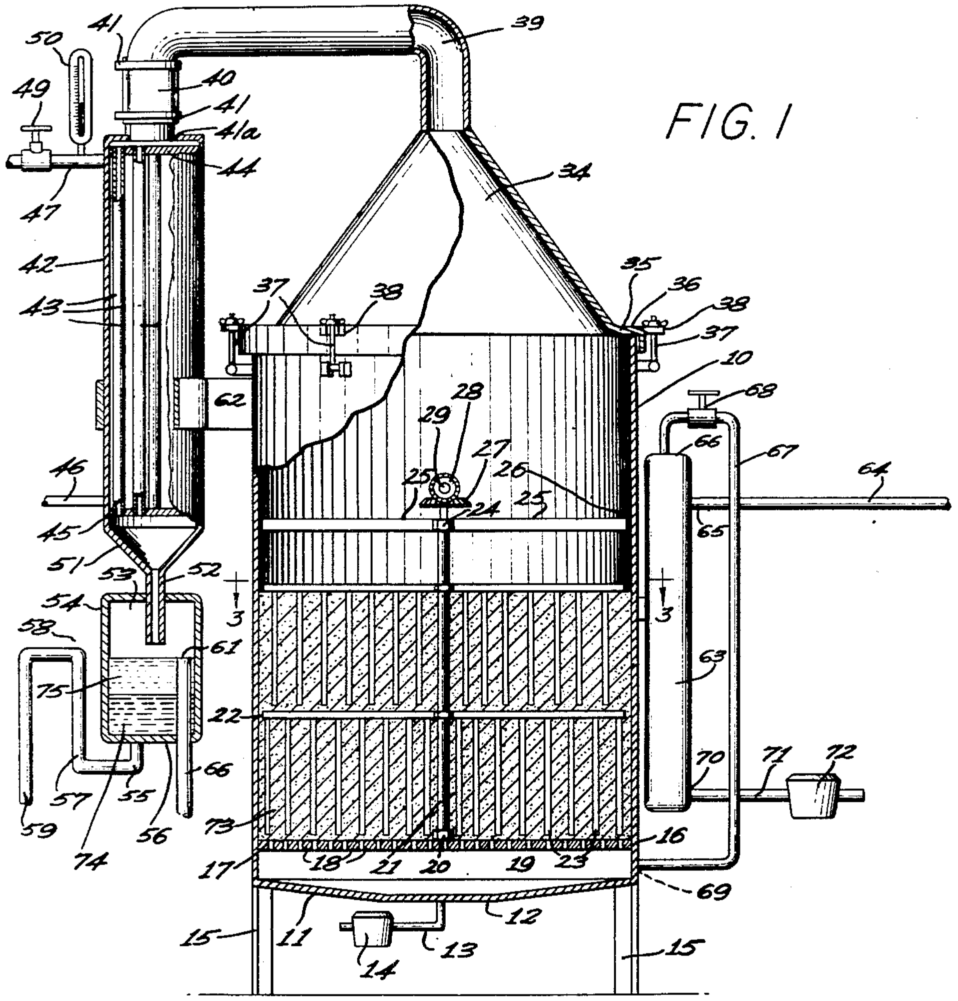
Figure 1 is a forward elevation of my device for providing the above mentioned process, with fragmentary sections being taken thereof.
Figure 2:
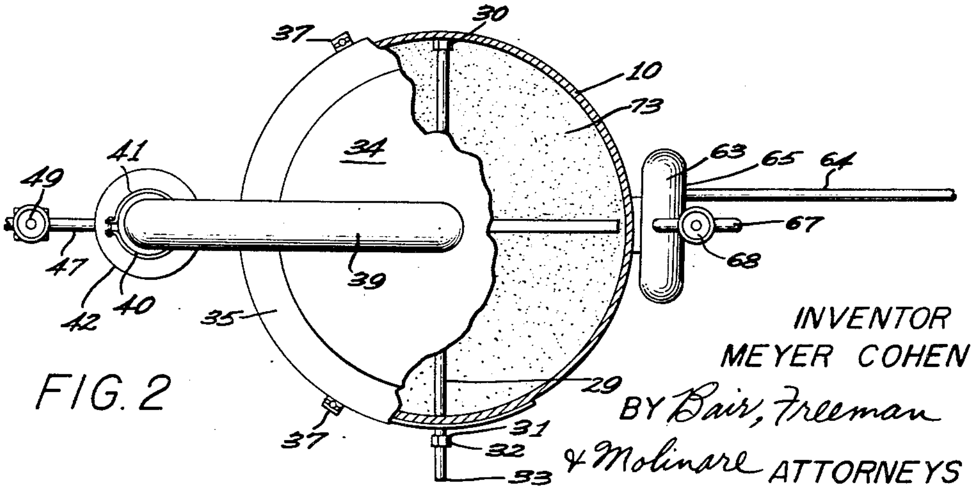
Figure 2 is a plan view of Figure 1 with fragmentary sections thereof.

I have used the character 10 to indicate a cylindrical container or vessel having the bottom wall 11, the bottom wall 11 including the depressed portion 12 which communicates with the pipe 13, which pipe communicates with the trap 14. Attached to the bottom wall 11 and supporting the vessel 10 are the legs 15.

Figure 3:
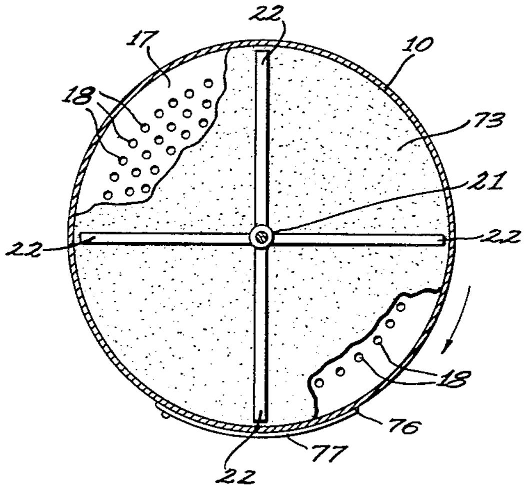
Figure 3 is a sectional view of Figure 1 taken generally along the line 3—3 of Figure 1.

Welded to the container 10 at 16 and completely about the periphery thereof is the circular plate 17, in which plate I provide a multiplicity of spaced openings 18, these openings being arranged substantially as shown in Figure 3 with the outer openings being spaced substantially inwardly from the cylindrical walls of the vessel 10.

A chamber 19 is thereby provided by this structure, between the plate 17 and the bottom wall 11.

Attached to the plate 17 is a bearing member 20 in which is journalled a vertical shaft 21 to which shaft are attached the various bars 22, it being noted from Figure 3 particularly that the bars 22 are arranged at right angles to each other, and attached to the various bars 22 are the vertically positioned agitator tines 23.

Figure 4:
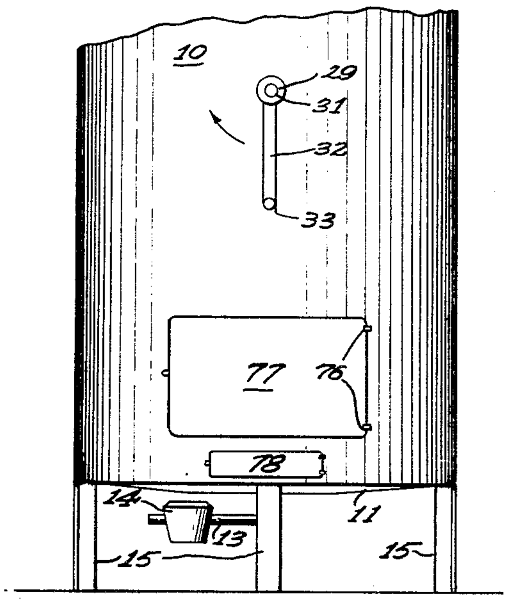
Figure 4 is a forward elevation of a portion of the device.

The shaft 21 is journalled within a further bearing 24 which is suitably secured by means of the transverse braces 25 which are attached at 26 to the wall of the container 10, and attached at the top of the shaft 21 is a bevel gear 27 which meshes with a smaller bevel gear 28, the bevel gear 28 being secured to a shaft 29 which is journalled at 30 within a suitable bearing attached to the wall of the member 10, the shaft 29 passing through the wall of the member 10, and being attached at 31 to the bar 32 (see Figure 4) which terminates in the handle portion 33. Any other suitable agitating means may be employed or it may be completely eliminated.

The vessel 10 is open at its upper end, and secured thereto is a conical member 34 which includes the annular portion 35, resting upon the gasket 36, the member 34 being secured at the top of the member 10 by means of the spaced T-bolts 37 secured to the lugs 38.

Attached to the top of the member 34 and communicating therewith is a hollow pipe 39 to which is clamped the rubber connecting hose 40, which is clamped thereto by means of the clamps 41, the member 40 communicating with the short pipe section 41a, which in turn communicates with the cylindrical water condenser 42, the condenser 42 including several vertically positioned tubes 43, the tubes 43 communicating through the upper plate 44 and through the lower plate 45, the space between the tubes being filled with the circulating cooling water, the pipe 46 indicating the supply or inlet pipe for the cooling water, the upper pipe 47 being the exit pipe which is controlled by means of the valve 49. The character 50 indicates a thermometer for registering the temperature of the cooling water.

Communicating with the condenser 42 is a conical member 51 which is secured to the vertically positioned tube 52 which passes through the upper wall 53 of a cylindrical vessel 54. Communicating at 55 with the bottom wall 56 of the vessel 54 is the pipe or tube 57 which is bent upwardly and thence downwardly, to which tube 57 is attached a short pipe section 58, which is open at its upper end to provide an air opening, the pipe or tube 57 passing downwardly at 59 to any suitable vessel which is to receive the reclaimed fluid.

Also passing through the bottom wall 56 is a water exit pipe 60, having its upper open end 61 at the approximate position shown.

The condenser 42 can be secured by means of a bracket 62 or by any other means.

Also attached to the vessel 10 is a condenser or steam separator member 63, this member being specifically provided to remove as much moisture as possible from the steam which is used in the process in order to provide a very dry steam. The steam pipe line is indicated by the character 64 which communicates with the member 63 at 65, and communicating at 66 with the member 63 is a further pipe 67 having the control valve 68, the pipe 67 communicating at 69 with the chamber 19. Attached at 70 to the separator or condenser unit 63 is the pipe 71 which communicates with a water trap 72 which is adapted to receive the moisture condensed from the steam in the member 63.

The filter muck from which the cleaning fluid is to be removed is placed in the vessel 10 after the conical member 34 is first removed by loosening the bolts 37, and after the upper clamp 41 has been loosened, this muck being generally indicated by the character 73, the muck being filled to the approximate level as shown in Figure 1. The member 34 is then replaced, and steam under approximately 50 pounds pressure or any other suitable pressure is allowed to enter the condenser 63 by means of the pipe 64. The volume of entering steam should be adjusted so that the flow through the muck 73 is not rapid enough to entrain any solid material. This steam will then be separated from its moisture content, which moisture will pass into the trap 72, and this very dry steam will then pass through the pipe 67 through the opening 69 into the chamber 19. This steam will pass through the openings 18 and will force upwardly through the muck, the heating action of the steam as well as the pressure thereof carrying the volatilized cleaning fluid which is to be reclaimed, upwardly into the conical member 34 and thence into the pipe 39, and into the condenser 42, these products then passing downwardly through the various tubes 43 where they are condensed by means of the cooling water, the condensed steam which is now in the form of water gravitating through the tube 52, and with the cleaning fluid also gravitating through the same tube.

Since the cleaning fluid is heavier than water, it will sink to the bottom of the vessel 54, this cleaning fluid being indicated by the character 74. This fluid will then be partially siphoned and will partially fall by gravity through the pipe 59 into any suitable vessel, the air opening at 58 preventing a maximum siphoning action, thereby maintaining the levels of the cleaning fluid and the water approximately as shown.

The condensed water is indicated by the character 75 and will pass through the opening 61 downwardly through the pipe 60 and will be carried away. After the process has run for approximately 30 minutes, the handle 33 is used to rotate the bar 32 to thereby rotate the shaft 29 which in turn will cause rotation of the bars 22, which will cause the tines 23 to stir or agitate the muck so that the passage of the steam upwardly and through the same will be accomplished with greater efficiency, and this stirring action can be applied from time to time to thereby increase the speed of separation. Such stirring is not essential, however, good results having been obtained in an extraction vessel containing no agitating means.

I have found through the actual operation of the device that the cleaning fluid to be reclaimed is completely removed from the absorbent powder with the resultant powder being completely dry after the process is completed, and I have found that the process will deliver the reclaimed fluid at approximately only .03¢ per gallon, which in effect results in a considerable saving. I have also found that the cleaning fluid is free of impurities, and ready for re-use. A chemical analysis indicating the purity of perchlorethylene extracted from muck in accordance with the invention is as follows:

| | |
|---|---|
| Non-volatile material | 0.00%. |
| Refractive index | 1.5028. |
| Stabilizer content | 0.0022% AMM. |
| Mineral acid | 0.012% as HCl. |
| Fatty acid | 0.027% as oleic. |
| Distillation range | 119°–120.5° C. |

Attached to the container 10 by means of suitable hinges 76, is an arcuate door 77 which communicates with a suitable opening in the member 10, which can be used as a doorway for cleaning out the muck or powder after the process has been completed.

A further door 78 communicates with the chamber 19 for removing any other existing products which might move downwardly through the openings 18, the trap 14 being used for the entrapment and condensation of excess water or steam. The positioning of the outer openings 18 at a substantial distance from the walls of the vessel 10 insures that the maximum amount of steam will penetrate the muck instead of passing along the extreme outer edges thereof, which obviously would result in a waste of such steam. The temperature of the cooling water will usually be around 85 to 95 degrees Fahrenheit, although this may vary according to conditions, and it should be realized that the apparatus could be made in any desired size and could also be made of a different construction without departing from the essential spirit of the process described.

The process of the invention is also suitable for separating the cleaning fluid from what is generally referred to in the trade as "still residue." Dry cleaning plants using chlorinated hydrocarbon solvents employ filters as described hereinabove to remove solid impurities, while liquid impurities which dissolve in the solvent are removed in a still. The heavy liquid impurities remaining after the solvent has been distilled off remain in the still residue, but this residue also contains a substantial quantity of solvent, say, 50 to 65% by weight. This solvent can be recovered by pouring the still residue over the dry powder remaining in the extraction vessel after the filter muck has been extracted, and then proceeding with the process of the invention just as described for the treatment of muck. Practically all of the solvent in the still residue may be recovered in this way, thus effecting a remarkable saving to the dry cleaner.

Although the invention has been described with reference to the dry cleaning industry, it will be understood that it is also well adapted for recovering purified chlorinated hydrocarbons contained in sludges or settlings from other processes. For example, in the vapor degreasing of metals with trichlorethylene large quantities of settlings containing dirt, grease, metal filings, oil, etc., in admixture with trichlorethylene are thrown away when the degreasing tank is cleaned. These settlings or sludge may be treated in accordance with my invention to recover substantially all of the chlorinated hydrocarbon in pure form.

From the foregoing description it becomes clear that my invention provides an efficient method for recovering solvent in pure form from sludge and muck that are normally discarded, to effect a remarkable savings.

Changes may be made in the process of my invention without departing from the real spirit and purpose of my invention, and it is my intention to cover by my claims any modified forms of the process which may be reasonably included within their scope.

I claim as my invention:

1. A method for recovering high gravity chlorinated hydrocarbon solvents from filter muck containing filter powder, said solvent, and impurities including dirt, oils, fats and soaps, which comprises supplying pressurized steam at a temperature above the boiling point of said solvent but below the volatilizing point of the impurities, removing the moisture from the steam, permitting the moisture free steam to rise uniformly through a mass of the muck to volatilize only said solvent in pure form, condensing the steam and volatilized solvent, and separating the purified liquid solvent from the condensed steam.

2. A method for recovering high gravity chlorinated hydrocarbon solvents from filter muck containing filter powder, said solvent, and impurities including dirt, oils, fats and soaps, which comprises supplying superheated steam at a temperature above the boiling point of said solvent but below the volatilizing point of the impurities, permitting said steam to rise uniformly through a mass of the muck to volatilize only said solvent in pure form, condensing the steam and volatilized solvent, and separating the purified liquid solvent from the condensed steam.

3. A method for recovering perchlorethylene solvent from filter muck containing filter powder, said solvent, and impurities including dirt, oils, fats and soaps, which comprises supplying pressurized steam at a temperature above the boiling point of said solvent but below the volatilizing point of the impurities, removing the moisture from the steam, permitting the moisture free steam to rise uniformly through a mass of the muck to volatilize only said solvent in pure form, condensing the steam and volatilized solvent, and separating the purified liquid solvent from the condensed steam.

4. A method for recovering perchlorethylene solvent from filter muck containing filter powder, said solvent and impurities including dirt, oils, fats and soaps, which comprises supplying moisture free steam at a temperature ranging from about 252° F. to about 293° F., permitting the moisture free steam to rise uniformly through a mass of the muck to volatilize only said solvent in highly pure form, condensing the steam and volatilized solvent, and separating the purified liquid solvent from the condensed steam.

5. A method for recovering a high gravity chlorinated hydrocarbon solvent from filter muck containing filter powder, said solvent and impurities including dirt, oils, fats and soaps, which comprises placing a mass of the muck in a closed vessel on a perforated plate adapted for directing fluid flow uniformly through said mass, introducing pressurized moisture free steam into the bottom of said vessel beneath said plate, and permitting the steam to flow upwardly through the perforations and the muck to volatilize only said solvent in highly pure form, condensing the steam and the volatilized solvent, and separating the purified liquid solvent from the condensed steam.

6. A method for recovering a high gravity chlorinated hydrocarbon solvent from filter muck containing filter powder, said solvent and impurities including dirt, oils, fats and soaps, which comprises a placing a mass of the muck in a closed vessel on a perforated plate adapted for directing fluid flow uniformly through said mass, introducing superheated steam into the bottom of said vessel beneath said plate, and permitting the steam to flow upwardly through the perforations and the muck to volatilize only said solvent in highly pure form, condensing the steam and the volatilized solvent, and separating the purified liquid solvent from the condensed steam.

References Cited in the file of this patent

UNITED STATES PATENTS

| | | |
|---|---|---|
| 1,382,890 | Burrell et al. | June 28, 1921 |
| 2,181,672 | Sutcliffe et al. | Nov. 28, 1939 |
| 2,376,839 | Wansker | May 22, 1945 |